(12) United States Patent
Alimian et al.

(10) Patent No.: US 10,481,733 B2
(45) Date of Patent: *Nov. 19, 2019

(54) TRANSFORMING RECEIVED TOUCH INPUT

(71) Applicant: Hewlett-Packard Development Company, L.P., Houston, TX (US)

(72) Inventors: Arman Alimian, Palo Alto, CA (US); Diogo Strube de Lima, Palo Alto, CA (US); Bradley Neal Suggs, Palo Alto, CA (US); Immanuel Amo, Sunnyvale, CA (US); Nicholas P Lyons, Palo Alto, CA (US); Evan Wilson, Sunnyvale, CA (US); Ruth Ann Lim, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,912

(22) Filed: Mar. 26, 2019

(65) Prior Publication Data

US 2019/0220146 A1    Jul. 18, 2019

Related U.S. Application Data

(63) Continuation of application No. 15/512,260, filed as application No. PCT/US2014/057312 on Sep. 24, 2014, now Pat. No. 10,275,092.

(51) Int. Cl.
*G06F 3/041* (2006.01)
*G06F 9/451* (2018.01)
(Continued)

(52) U.S. Cl.
CPC .......... *G06F 3/0418* (2013.01); *G06F 1/1605* (2013.01); *G06F 1/1639* (2013.01);
(Continued)

(58) Field of Classification Search
CPC ........ G06F 3/044; G06F 3/0418; G06F 9/451; G06F 3/041; G06F 3/038; G06F 3/0488;
(Continued)

(56) References Cited

U.S. PATENT DOCUMENTS

| 7,561,146 B1 | 7/2009 | Hotelling |
| 7,599,561 B2 | 10/2009 | Wilson et al. |

(Continued)

FOREIGN PATENT DOCUMENTS

| WO | WO-0235461 | 5/2002 |
| WO | WO-2013019255 | 2/2013 |

(Continued)

OTHER PUBLICATIONS

Ahmed Sabbir Arif, "Predicting and Reducing the Impact of Errors in Character-Based Text Entry," A Dissertation, York University, Apr. 2014, 179 pages.

(Continued)

*Primary Examiner* — Muhammad N Edun
(74) *Attorney, Agent, or Firm* — HP Inc. Patent Department

(57) ABSTRACT

In an example implementation according to aspects of the present disclosure, a method may include receiving, on a touch sensitive mat of a computing system, a touch input associated with a first event type. The method further includes determining whether to transform the touch input associated with the first event type to a different event type, and sending, to an application, the touch input associated with an event type based according to the determination.

18 Claims, 5 Drawing Sheets

(51) Int. Cl.
  *G06F 3/0488* (2013.01)
  *G06F 1/16* (2006.01)
  *G06F 3/01* (2006.01)
  *G06F 3/038* (2013.01)
  *G06F 3/042* (2006.01)
  *G06F 3/044* (2006.01)

(52) U.S. Cl.
  CPC .......... *G06F 1/1673* (2013.01); *G06F 1/1686* (2013.01); *G06F 3/017* (2013.01); *G06F 3/038* (2013.01); *G06F 3/041* (2013.01); *G06F 3/044* (2013.01); *G06F 3/0426* (2013.01); *G06F 3/0488* (2013.01); *G06F 9/451* (2018.02); *G06F 2203/04106* (2013.01)

(58) Field of Classification Search
  CPC ...... G06F 3/017; G06F 3/0426; G06F 1/1605; G06F 1/1639; G06F 1/1686; G06F 1/1673; G06F 2203/04106
  See application file for complete search history.

(56) References Cited

U.S. PATENT DOCUMENTS

| | | | |
|---|---|---|---|
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,384,683 B2 | 2/2013 | Luo | |
| 8,390,583 B2 | 3/2013 | Forutanpour et al. | |
| 8,736,583 B2 | 5/2014 | Anderson et al. | |
| 2005/0078092 A1 | 4/2005 | Clapper | |
| 2008/0018591 A1 | 1/2008 | Pittel et al. | |
| 2009/0174679 A1 | 7/2009 | Westerman | |
| 2010/0103127 A1 | 4/2010 | Park et al. | |
| 2011/0047459 A1 | 2/2011 | Van Der Westhuizen | |
| 2011/0069021 A1 | 3/2011 | Hill | |
| 2011/0130019 A1 | 6/2011 | Lim et al. | |
| 2011/0242054 A1 | 10/2011 | Tsu | |
| 2011/0310019 A1 | 12/2011 | Wilson | |
| 2012/0023459 A1 | 1/2012 | Westerman | |
| 2012/0089348 A1 | 4/2012 | Perlin et al. | |
| 2012/0105481 A1 | 5/2012 | Baek et al. | |
| 2013/0077236 A1 | 3/2013 | Becze et al. | |
| 2013/0203495 A1 | 8/2013 | Yeh | |
| 2013/0257748 A1 | 10/2013 | Ambrus et al. | |
| 2013/0290761 A1 | 10/2013 | Moon | |
| 2014/0043241 A1 | 2/2014 | Sukumar | |
| 2014/0152622 A1 | 6/2014 | Takeda | |
| 2014/0160085 A1 | 6/2014 | Rabii | |
| 2015/0242009 A1 | 8/2015 | Xiao | |
| 2018/0032179 A1 | 2/2018 | Forlines | |

FOREIGN PATENT DOCUMENTS

| | | |
|---|---|---|
| WO | WO-2013144807 | 10/2013 |
| WO | WO-2013-175389 A1 | 11/2013 |

OTHER PUBLICATIONS

Atmel ~ "Maximizing Touchscreen Performance by Pairing Powerful Circuitry with Intelligent Software," Jan. 9, 2012, White Paper ~ 7 pages.

PCT Search Report/Written Opinion ~ Application No. PCT/US2014/057312 dated May 28, 2015 ~ 10 pages.

Shahram Izadi et al., "C-Slate: A Multi-Touch and Object Recognition System for Remote Collaboration using Horizontal Surfaces," 2007, pp. 3-10, IEEE.

TRANSFORMING RECEIVED TOUCH INPUT

PRIORITY INFORMATION

This application is a continuation of U.S. National Stage application Ser. No. 15/512,260 filed on Mar. 17, 2017, which claims priority to Application No. PCT/US2014/057312 filed on Sep. 24, 2014, the contents of which are incorporated herein by reference in its entirety.

BACKGROUND

Many computing systems include at least one display and at least one input device. The display may include, for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein.

DETAILED DESCRIPTION

Figure 1:
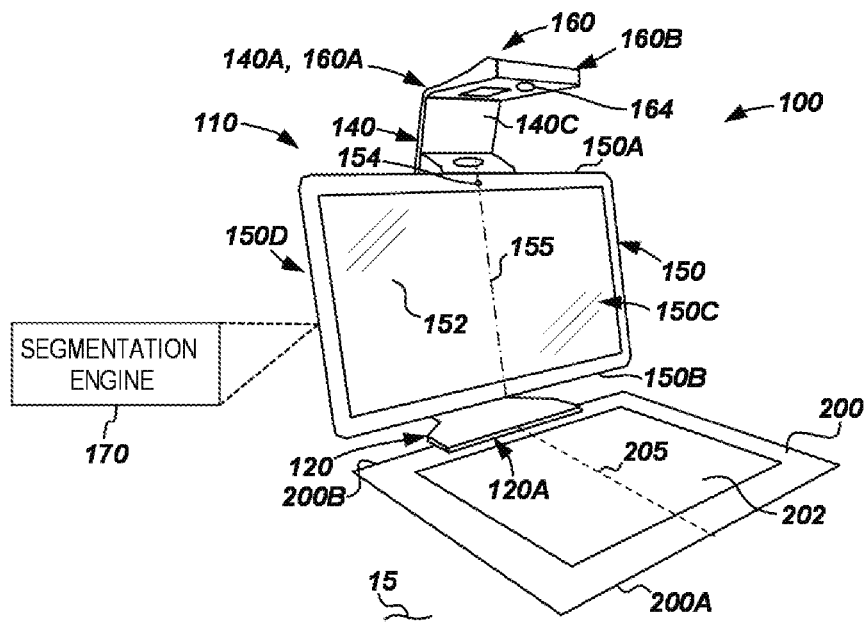
FIG. 1 is a schematic perspective view of an example computing system.

Referring now to the drawings, FIGS. 1-6 are schematic views of an example computing system 100 comprising a segmentation engine 170. In some examples, segmentation engine 170 may determine a segmentation boundary representing at least one outer edge of an object based on a captured image, as will be further described. In the example of FIGS. 1-6, system 100 generally comprises a support structure 110, a computing device 150, a projector unit 180, and a projection screen 200.

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 150C, a rear side 150D also extending axially between sides 150A and 150C and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
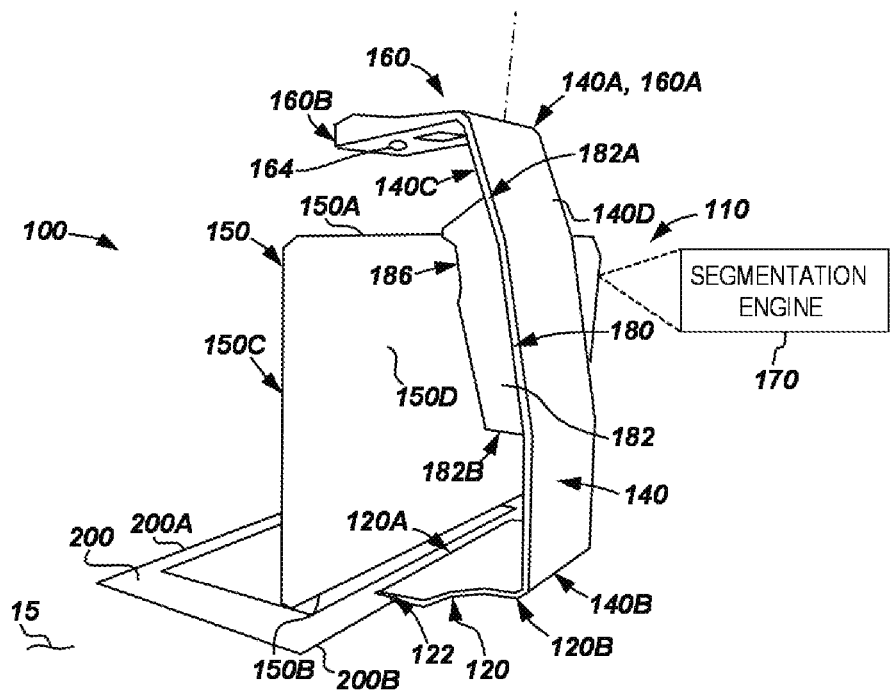
FIG. 2 is another schematic perspective view of the example computing system of FIG. 1.

In the example of FIGS. 1-6, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 180, device 150, top 160, etc.). In some examples, base 120 may engage with support surface 15 in this manner when system 100 is configured for operation. In the example of FIGS. 1-6, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of projection screen 200 may be disposed in (e.g., received within) the space formed between portion 122 and surface 15. In such examples, placing a portion of screen 200 within the space created by portion 122 and surface 15 may assist with the proper alignment of screen 200. In other examples, other suitable methods or devices may be used to assist with the alignment of screen 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140C. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or more of base 120, member 140, and top 160 may be formed of separate pieces (i.e., not monolithically formed).

Projection screen 200 may include a central axis or centerline 205, a first or front side 200A, and a second or rear side 200B axially opposite the front side 200A. In the example of FIGS. 1-6, screen 200 may comprise a touch-sensitive region 202 substantially aligned with axis 205. Region 202 may comprise any suitable technology for detecting physical contact (e.g., touch input), as described above (e.g., capacitive touch mat). For example, touch-sensitive region 202 may comprise any suitable technology for detecting (and in some examples tracking) one or multiple touch inputs by a user to enable the user to interact, via such touch input, with software being executed by device 150 or another computing device. In the example of FIGS. 1-6, region 202 extends over less than all of screen 200. In other examples, region 202 may extend over substantially all of screen 200 (e.g., may be substantially coterminous with screen 200). In examples described herein, projection screen 200 may be any suitable planar object, such as a mat (e.g., a touch-sensitive mat), tabletop, sheet, etc. In some examples, projection screen 200 may be disposed horizontal (or approximately or substantially horizontal). For example, screen 200 may be disposed on support surface 15, which may be horizontal (or approximately or substantially horizontal).

As described above, screen 200 may be aligned with base 120 of structure 110 to assist with proper alignment of screen 200 (e.g., at least during operation of system 100). In the example of FIGS. 1-6, rear side 200B of screen 200 may be disposed between raised portion 122 of base 120 and support surface 15, such that rear end 200B is aligned with front side 120A of base 120 to assist with proper overall alignment of screen 200 (and particularly proper alignment of region 202) with other components of system 100. In some examples, screen 200 may be aligned with device 150 such that the center line 155 of device 150 is substantially aligned with center line 205 of screen 200. In other examples, screen 200 may be differently aligned with device 150.

In some examples, region 202 of screen 200 and device 150 may be communicatively connected (e.g., electrically coupled) to one another such that user inputs received by region 202 may be communicated to device 150. Region 202 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-6, exposed electrical contacts disposed on rear side 200B of screen 200 may engage with corresponding electrical pogo-pin leads within portion 122 of base 120 to communicate information (e.g., transfer signals) between device 150 and region 202 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of screen 200.

Figures 3, 4:
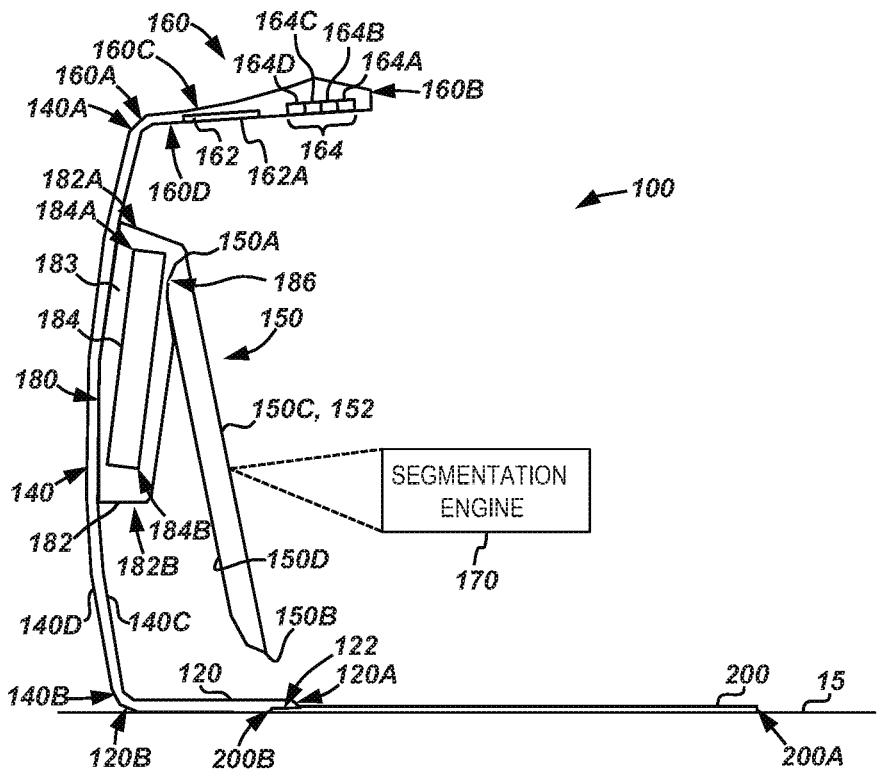
FIG. 3 is a schematic side view of the example computing system of FIG. 1.
FIG. 4 is a schematic front view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first or upper end 184A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCoS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-6, device 150 is communicatively connected to assembly 184 through electrical leads or conductors (e.g., as described above in relation to screen 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160D of top 160 and is positioned to reflect light, image(s), etc., projected from upper end 184A of projector assembly 184 toward screen 200 during operation. Mirror 162 may comprise any suitable type of mirror or reflective surface. In the example of FIGS. 1-6, fold mirror 162 may comprise a standard front surface vacuum metalized aluminum coated glass mirror that acts to fold light emitted from assembly 184 down to screen 200. In other examples, mirror 162 may have a complex aspherical curvature to act as a reflective lens element to provide additional focusing power or optical correction.

Sensor bundle 164 includes a plurality of sensors (e.g., cameras, or other types of sensors) to detect, measure, or otherwise acquire data based on the state of (e.g., activities occurring in) a region between sensor bundle 164 and screen 200. The state of the region between sensor bundle 164 and screen 200 may include object(s) on or over screen 200, or activit(ies) occurring on or near screen 200. In the example of FIG. 3, bundle 164 includes an RGB camera 164A (or another type of color camera 164A), an IR camera 164B, a depth camera (or depth sensor) 164C, and an ambient light sensor 164D.

In some examples, RGB camera 164A may be a camera to capture color images (e.g., at least one of still images and video). In some examples, RGB camera 164A may be a camera to capture images according to the RGB color model, which may be referred to herein as "RGB images". In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward screen 200 and may capture image(s) of screen 200, object(s) disposed between screen 200 and RGB camera 164A (e.g., on or above screen 200), or a combination thereof.

IR camera 164B may be a camera to detect intensity of IR light at a plurality of points in the field of view of the camera 164B. In examples described herein, IR camera 164B may operate in conjunction with an IR light projector of system 100 to capture IR images. In such examples, each IR image may comprise a plurality of pixels each representing an intensity of IR light detected at a point represented by the pixel. In some examples, top 160 of system 100 may include an IR light projector to project IR light toward screen 200 and IR camera 164B may be pointed toward screen 200. In such examples, IR camera 164B may detect the intensity of IR light reflected by screen 200, object(s) disposed between screen 200 and IR camera 164B (e.g., on or above screen 200), or a combination thereof. In some examples, IR camera 164B may exclusively detect IR light projected by IR light projector (e.g., as reflected from screen 200, object(s), etc., or received directly).

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a three-dimensional object) is on screen 200. In some examples, depth sensor 164C may detect at least one of the presence, shape, contours, motion, and the respective distance(s) of an object (or portions thereof) placed on screen 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the screen 200 (e.g., about region 202 of screen 200). In other examples, the user interface sensor may additionally or alternatively include IR camera(s) or sensor(s) arranged to detect infrared light that is either emitted or reflected by a user input device.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-6, electrical conductors may be routed from bundle 164, through top 160, upright member 140, and projector unit 180 and into device 150 through leads that are disposed within mounting member 186 (as described above).

Figure 5:
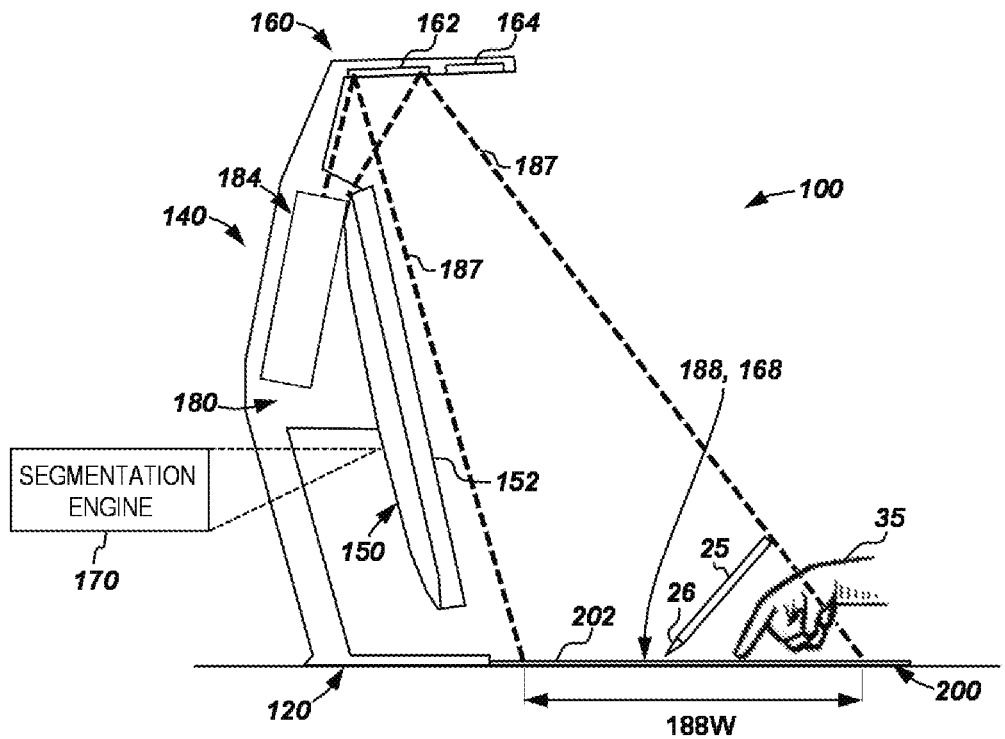
FIG. 5 is a schematic side view of the example computing system of FIG. 1 during an example operation.
Figure 6:
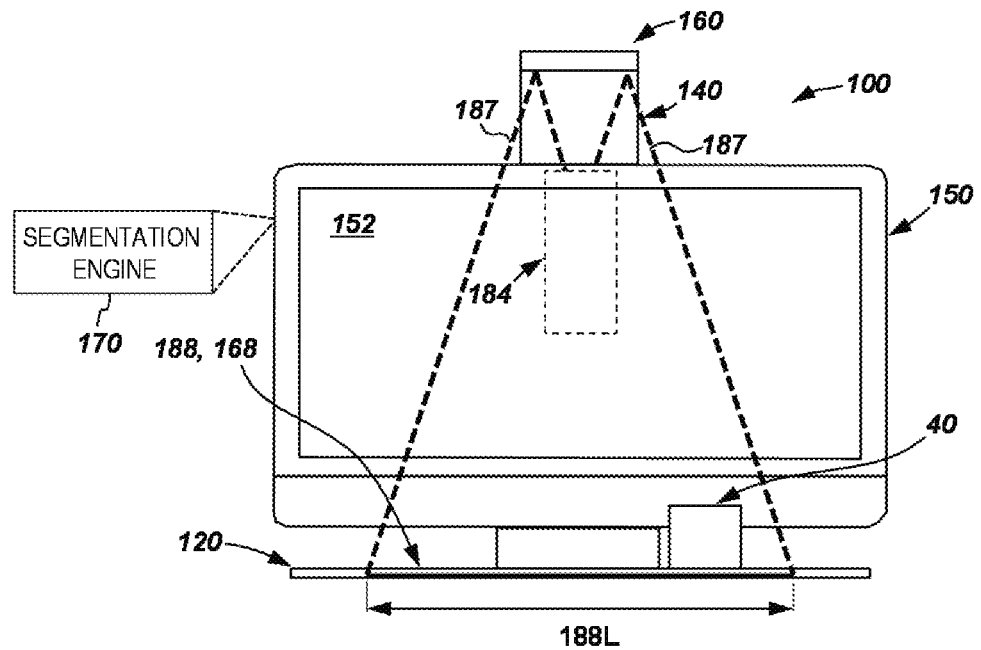
FIG. 6 is a schematic front view of the example computing system of FIG. 1 during an example operation.

Referring to FIGS. 5 and 6, during operation of system 100, projector assembly 184 may project visible light 187 to reflect off of mirror 162 towards screen 200 to thereby display visible image(s) on a projector display space 188 of screen 200. In the example of FIGS. 5-6, space 188 may be substantially rectangular, having a length 188L and a width 188W. In some examples, length 188L may be approximately 16 inches, while width 188W may be approximately 12 inches. In other examples, length 188L and width 188W may have different values.

In some examples, cameras 164A-164C of sensor bundle 164 are arranged within system 100 such that the field of view of each of cameras 164A-164C includes a space 168 of screen 200 that may overlap with some or all of display space 188 or may be coterminous with display space 188. In examples described herein, the field of view of cameras 164A-164C may be said to include space 168, though at times screen 200 may be at least partially occluded by object(s) on or over screen 200. In such examples, the object(s) on or over screen 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of screen 200. In some examples, both space 188 and space 168 coincide or correspond with region 202 of screen 200 such that functionalities of touch sensitive region 202, projector assembly 184, and sensor bundle 164 are all performed in relation to the same defined area.

Referring now to FIGS. 5-6, device 150 may direct projector assembly 184 to project image(s) onto region 202 of screen 200. Device 150 may also display image(s) on display 152 (which may be the same as or different from the image(s) projected onto region 202 by projector assembly 184). The image(s) projected by assembly 184 may comprise information and/or images produced by software being executed by device 150. In some examples, a user may interact with the image(s) projected on region 202 and displayed on display 152 by physically engaging the touch-sensitive region 202 of screen 200 in any suitable manner, such as with user's hand 35 (e.g., via touches, taps, gestures, or other touch input), with a stylus 25, or via any other suitable user input device(s). Touch-sensitive region 202 may detect such interaction via physical engagement with region 202. Also, in some examples, assembly 184 may also project image(s) (at least partially) on objects disposed over screen 200 (e.g., hand 35, as shown in FIG. 5).

As an example, when a user interacts with region 202 of screen 200 (e.g., with a hand 35, as shown in FIG. 5), touch-sensitive region 202 may generate touch input information and provide it to device 150 through any suitable connection (examples of which are described above). In some examples, the touch input information may be provided to an operating system (OS) executing on device 150, and may further be passed by the OS to another application (e.g., program, etc.) executing on device 150. In response, the executing OS or application may alter image(s) projected by projector assembly 184, image(s) displayed on display 152, or a combination thereof. As used herein, an "application" (or "computer application") is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.). In some examples, region 202 (with image(s) projected on it by assembly 184) may serve as a second or alternative touch-sensitive display within system 100.

In some examples, sensors of sensor bundle 164 may also generate system input that may be provided to device 150 for further processing. For example, system 100 may utilize at least sensor(s) (or cameras) of bundle 164 and segmentation engine 170 detect at least one of the presence and location of an object (e.g., a user's hand 35 or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors that are arranged to perform stereoscopic stylus tracking (e.g., of stylus 25). In other examples, stylus 25 includes a tip 26 coated with an infrared retro-reflective coating (e.g., paint) such that tip 26 may serve as an infrared retro-reflector. In such examples, bundle 164 may include IR camera(s) (or sensor(s)), as described above, which detect IR light that is reflected off of tip 26 to enable device 150 to track the location of tip 26 as it moves across region 202.

In some examples, system 100 may capture two-dimensional (2D) image(s) or create a three-dimensional (3D) scan of a physical object such that an image of the object or other information related to the object may then be projected onto region 202 for further use and manipulation thereof. For example, as shown in FIG. 6, an object 40 may be placed on region 202 such that sensors of bundle 164 (e.g., at least one of cameras 164A-164C) may capture an image of the object 40. In such examples, the image captured by the sensors of bundle 164 may be provided to device 150 (e.g., an OS, application, etc.), as described above. Object 40 may be, for example, a book, a document, a photo, or any other physical object.

In some examples, once object(s) are scanned by sensors of bundle 164, the background of the image representing the object may be removed (e.g., via a segmentation process), and the resulting image of the foreground object, or information related to the object, may be projected onto region 202 (or shown on display 152). In such examples, images of physical objects (e.g., object 40) may be captured, processed, and displayed on region 202 to quickly and easily create a digital version of the physical object to allow for further manipulation thereof, as will be further described. The background of the image representing the object 40 that is removed may correspond to at least a portion of the screen 200. In some examples, a segmentation process may comprise determining a segmentation boundary for an object represented in the image captured by the sensors of bundle 164. As used herein, a "segmentation boundary" for an object represented in an image may be information representing an estimate of which portion(s) of the image represent the object and which portion(s) of the image represent features other than the object, such as the projection screen 200. In some examples, a segmentation boundary for an object represented in an image may include information representing at least one outer edge of the object as represented in the image. When performing a segmentation process, the system 100 may use the segmentation boundary to extract an image of the object from a larger captured image including, at least, a portion of the projection screen 200.

Touch-enabled devices tend to pass all detected touch inputs to the OS, and may further be passed by the OS to another application (e.g., a program or executing application). For example, touch input may be perceived and processed at lower levels in a system (e.g., hardware, firmware, driver), and executing applications on the system may receive the touch user input information from the OS. However, the detected touch inputs may include both valid and invalid touch inputs. As an example, invalid touch inputs may include the user mistakenly brushing the touch surface, or when the user rests their palms on the touch device to use a stylus or draw on the touch surface.

Examples disclosed herein provide a system to intelligently process touch input received on a touch-enabled device. As an example, the system may differentiate between valid and invalid touch inputs, and pass only valid touch inputs to the OS or an executing application. In addition to differentiating between valid and invalid touch inputs, the system may combine detected touch inputs on the touch-enabled device with other input events and/or information from the system, possibly transforming the detected touch inputs into different classes of inputs before passing the transformed input to the OS or application, as will be further described. With the emergence and popularity of touch-enabled devices, the innovative touch processing capabilities disclosed herein may enhance the user experience.

Figure 7:
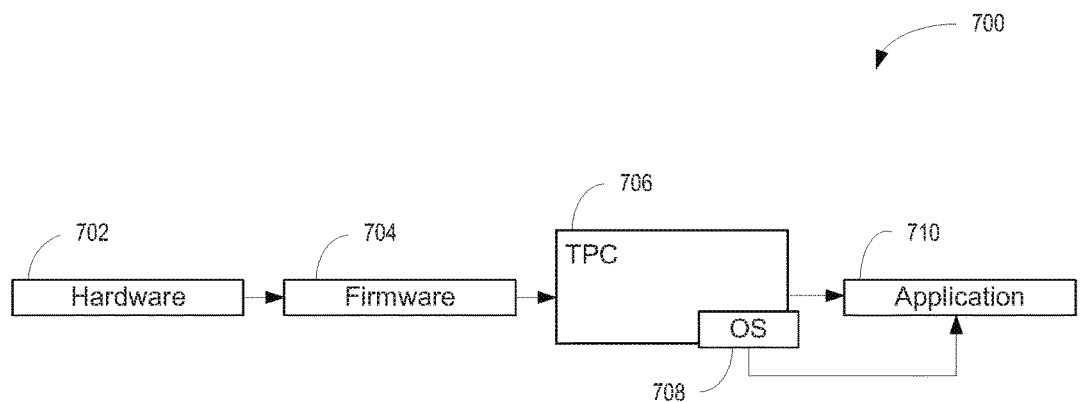
FIG. 7 is a pipeline illustrating a system for intelligently processing touch input received on a touch-enabled device, as an example.

FIG. 7 is a pipeline illustrating a system 700 for intelligently processing touch input received on a touch-enabled device, as an example. The system 700 may be a portion of computing system 100 of FIG. 1. Hardware 702 and firmware 704 may correspond, as an example, to at least the touch-sensitive region 202 of projection screen 200 (e.g., mat 202) and corresponding firmware executable by a processor in the system 100. Hardware 702 may also include other input devices of the system 100, such as the sensor bundle 164. Rather than passing all detected touch inputs to the operating system (OS) 708, which may include invalid inputs, a touch processing controller (TPC) 706 may intercept detected touch inputs from the firmware 704.

As will be further described, the TPC 706 may allow for touch input generated by the hardware 702 to be routed outside the OS pre-defined behavior, which may not account for invalid touch inputs and other input events. For example, the TPC 706 may be utilized in order to differentiate between valid and invalid touch inputs, thereby, rejecting invalid touch inputs. In addition, the TPC 706 may combine detected touch inputs from the mat 202 with other input events, for example, from sensor bundle 164, and/or information from the system, possibly transforming the detected touch inputs into different classes of inputs before passing the transformed input to the OS or application. However, the TPC 706 may also pass the intercepted touch inputs from the firmware 704 to the OS 708, for example, if the TPC 706 is not able to process the touch input.

Referring to FIG. 7, an executing application 710 on the system 700 may then have the option to receive touch input from the OS 708 or the TPC 706. The TPC 706 can be implemented in hardware, implemented as machine-readable instructions executable on processor(s), or implemented as a combination of hardware and machine-readable instructions. In examples where the TPC 706 is implemented at least in part with machine-readable instructions, these machine-readable instructions can be in the form of software executable on processor(s), or software or firmware executable by a processor in the computing device 150 (e.g., processing resource 810 in FIG. 8).

In order to intelligently process touch input received on a touch-enabled device (e.g., mat 202), higher level components of the system 700, such as the OS 708 or the application 710 may programmatically modify the valid touch filtering process to better match the needs of the system 700. As an example, in order to receive touch input from the TPC 706, an application developer for application 710 may take advantage of an application programming interface (API) to customize the touch input of the system 700 and provide a variety of experiences to the end user. For example, the API may be utilized to provide virtual components or layers, such as a keyboard and/or a trackpad, on the mat 202. The TPC 706 may then intercept any touch for interacting with the virtual components projected onto the mat 202, and filter the touches under control of the higher level software (e.g., the OS 708 or the application 710).

Depending on the touch location on the mat 202, after intercepting the touch, the TPC 706 may reject the touch (e.g., invalid touch outside geometric regions of the virtual components), inject the touch into the OS 708 or application 710, or perform other actions based on the requirements of the selected layer and possibly other components in the system. As an example, other actions may refer, but is not limited to, combining the intercepted touch with data from other input devices, such as the sensor bundle 164, and determining what to do with it. The decision on what to do with the touch may be made based on the layers defined in the TPC 706. As an example, if the API provides a virtual trackpad on the mat 202, the TPC 706 may transform any touch input received on the trackpad to a mouse input or mouse event, before injecting the transformed input into the OS 708 or application 710. The API may be utilized to access, create, remove, and edit all layers managed by the TPC 706.

Figure 8:
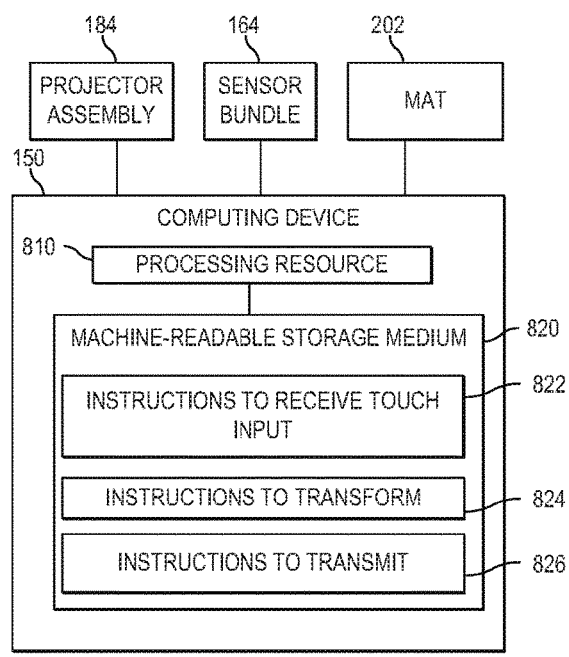
FIG. 8 is a block diagram of an example portion of the computing system of FIG. 1.

FIG. 8 is a block diagram of a portion of computing system 100 of FIG. 1 comprising segmentation engine 170. In particular, FIG. 8 illustrates an example of computing device 150 that comprises segmentation engine 170 and is communicatively connected to projector assembly 184, sensor bundle 164, and touch-sensitive region 202 of projection screen 200 (touch sensitive mat 202). Although not shown in FIG. 8, computing device 150 may also be communicatively connected to other components of system 100, as described above.

Computing device 150 (or any other computing device implementing segmentation engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Referring to FIG. 8, the computing device 150 includes a processing resource 810, and a machine-readable storage medium 820 comprising (e.g., encoded with) instructions 822, 824, and 826. In some examples, storage medium 820 may include additional instructions. In other examples, instructions 822, 824, and 826, and any other instructions described herein in relation to storage medium 820, may be stored on a machine-readable storage medium remote from but accessible to computing device 150 and processing resource 810. Processing resource 810 may fetch, decode, and execute instructions stored on storage medium 820 to implement the functionalities described below. In other examples, the functionalities of any of the instructions of storage medium 820 may be implemented in the form of electronic circuitry, in the form of executable instructions encoded on a machine-readable storage medium, or a combination thereof. Machine-readable storage medium 820 may be a non-transitory machine-readable storage medium.

In some examples, the instructions can be part of an installation package that, when installed, can be executed by the processing resource 810. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

In the example of FIG. 8, a computing system, such as computing system 100 described above in relation to FIG. 1, may comprise computing device 150, projector assembly 184, sensor bundle 164, and touch sensitive mat 202. In some examples, instructions 822 may include instructions for receiving, on the touch sensitive mat 202, a touch input associated with a first event type. Mat 202 may comprise any suitable technology for detecting physical contact (e.g., touch input). Referring back to FIG. 7, the TPC 706 may intercept the touch input received from the mat 202. As will be further described, the TPC 706 may repurpose or transform the intercepted touch input into a different class of input or event type, before injecting or presenting the transformed input to the OS or application. As an example, the TPC 706 may receive touch input from the mat 202 and change it into a mouse event before injecting the mouse event into the OS or application. Although touch and mouse inputs may appear similar to the user, the OS may process touch and mouse inputs separately or differently.

Instructions 824 may include instructions for determining whether to transform the touch input associated with the first event type to a different event type. As an example, an API may be utilized to provide virtual components or layers, such as a keyboard and/or trackpad, on the mat 202 (e.g., images of virtual components projected onto the mat 202 via projector assembly 184). Each virtual component image projected onto the mat 202 may have geometric regions for determining whether touch input received on the mat 202 falls within the geometric regions. As described above, the TPC 706 may intercept touch inputs on the mat 202 and transform them to different event types based on whether the touch inputs fall in any of the geometric regions. As an example, if any touch inputs fall outside the geometric regions of the projected images of the virtual components, the TPC 706 may consider such touch inputs as invalid (e.g., inadvertent touches on the mat 202 by the user). However, if the TPC 706 determines that touch inputs occur on one of the geometric regions, the TPC 706 may transform such touch inputs to a touch input associated with an event type corresponding to the geometric region. As an example, if the TPC 706 detects that a touch input on the mat 202 falls within the geometric region of a virtual trackpad, the TPC 706 may transform the touch input into an event type corresponding to the trackpad, such as a mouse event.

As there may be various virtual components projected onto the mat 202, with corresponding geometric regions, a few of the geometric regions may overlap. For example, a virtual keyboard, corresponding to keyboard events, may have a geometric region that at least partially overlaps with the geometric region of a virtual trackpad, corresponding to mouse events. As an example, the API providing the virtual components may prioritize one virtual component over another. The steps for determining prioritization may vary. For example, the virtual trackpad may have a preassigned prioritization over the keyboard, such that touch inputs received on an area of the mat 202 with overlapping geometric regions may be transformed to mouse events.

As an example, in addition to prioritizing the virtual components, the virtual components may be dynamically enabled or disabled. For example, although a virtual component may be projected onto the mat 202, if the component is disabled, any touch inputs in the geometric region of the component may not be detected. As an example, the virtual trackpad may be disabled while a user is typing using the virtual keyboard. Once the user completes typing, the virtual trackpad may be enabled again for detecting touch input. In addition to enabling or disabling virtual components, the virtual components may be dynamically reconfigured. For example, a geometric region of a virtual component may by modified, such as the size or location of the geometric region on the mat 202. Such reconfiguration may be initiated by the system 100 itself or by a user of the system 100. For example, the user may move or resize the geometric region of a virtual component projected onto the mat 202.

As described above, the TPC 706 of the system may combine detected touch inputs on the mat 202 with other input events and/or information from the system, possibly transforming the detected touch inputs into different classes of inputs before passing the transformed input to the OS or application. As an example, the TPC 706 may receive, from other input devices of the system, information regarding touch inputs on the mat 202 and, as a result, potentially transform the touch input according to the information received from the other input devices. Referring to FIG. 5, the TPC may receive information from sensor bundle 164 regarding the touch input on the mat 202 (e.g., via hand 35), and determine whether to reject portions of the touch input. For example, the sensor bundle 164 may detect spurious inputs, such as a palm touch, where the sensor bundle 164 sees a hand at the location of a touch input on the mat 202. The input touches in the palm area may be rejected by the TPC 706, as the sensor bundle 164 knows the location of the palm.

As an example of combining detected touch inputs on the mat 202 with information from the system, the TPC 706 may use a history of touch inputs and locations to reject improbable events, such as a user moving their finger at a fast speed over the mat 202. The state information of previous touches may be used to calculate a time interval and distance to give a finger speed.

Instructions 826 may include instructions for transmitting or sending, for example, to an executing application, the touch input associated with an event type based according to the determination described above. As an example, the touch input may also be sent to an OS, as illustrated in FIG. 7. The application may decide if it wants to receive the touch input from the OS or from the TPC. By having the capability to receive touch input outside the OS pre-defined behavior, the innovative touch processing capabilities described may enhance the user experience.

Figure 9:
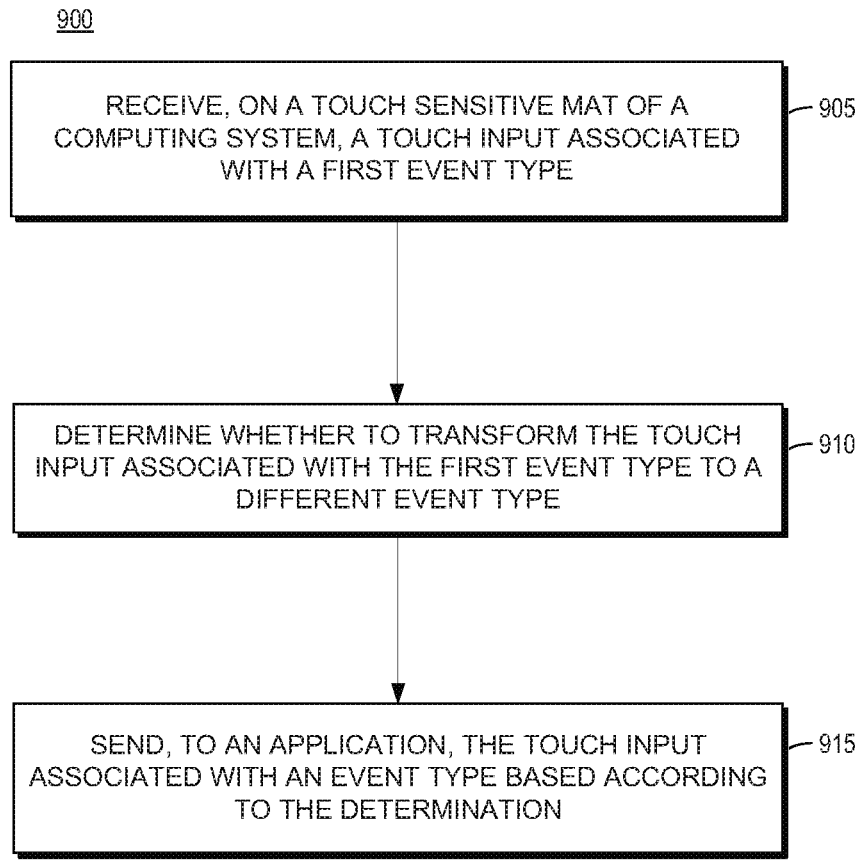
FIG. 9 is a flow diagram depicting steps to implement an example.

FIG. 9 is a flowchart of an example method 900 for determining whether to transform a received touch input. Although execution of method 900 is described below with reference to computing system 100 of FIG. 1, other suitable systems for execution of method 900 can be utilized. Additionally, implementation of method 900 is not limited to such examples.

At 905 of method 900, system 100 may receive, on the touch sensitive mat 202 of system 100, a touch input associated with a first event type. Referring back to FIG. 7, the TPC 706 may intercept the touch input received from the mat 202.

At 910, the system 100 may determine whether to transform the touch input associated with the first event type to a different event type (e.g., mouse event or keyboard event). As an example, an API may be utilized to provide virtual component or layers, such as a keyboard and/or trackpad, on the mat 202. Each virtual component may be assigned a geometric region on the mat 202. As an example, the system 100 may determine whether the touch input associated with the first event type occurs on one of the geometric regions described above. If the touch input occurs on one of the geometric regions, the system 100 may transform the touch input associated with the first event type to a touch input associated with an event type corresponding to the geometric region. As an example, if the system 100 determines that the touch input falls within the geometric region of a virtual trackpad, the system 100 may transform the touch input into an event type corresponding to the trackpad, such as a mouse event.

As an example, the system 100 may receive, from other input devices of the system 100 (e.g., sensor bundle 164), information regarding the touch input associated with the first event type. The system 100 may transform the touch input associated with the first event type according to the information received from the other input devices. As an example, if the sensor bundle 164 is utilized to provide information regarding touch inputs, the system 100 may determine to reject portions of the touch input (e.g., palm rejections). At 915, the system 100 may send, to an application, the touch input associated with an event type based according to the determination described above.

Although the flowchart of FIG. 9 shows a specific order of performance of certain functionalities, method 900 is not limited to that order. For example, the functionalities shown in succession in the flowchart may be performed in a different order, may be executed concurrently or with partial concurrence, or a combination thereof. In some examples, features and functionalities described herein in relation to FIG. 9 may be provided in combination with features and functionalities described herein in relation to any of FIGS. 1-8.

What is claimed is:

1. A system, comprising:
   a touch sensitive mat communicatively coupled to a computing device;
   the computing device including a machine-readable storage medium and a processing resource to execute non-transitory machine-readable instructions to cause the processing resource to:
   receive a touch input by the touch sensitive mat associated with an event type;
   determine whether the touch input is received within a particular geometric region of a plurality of geometric regions on the touch sensitive mat;
   in response to the touch event being received:
   outside the particular geometric region, determine the touch input is invalid; and
   inside the particular geometric region, determine whether to transform the touch input associated with the event type to a different event type; and
   send the touch input to an application executing on the computing device based on the determination.

2. The system of claim 1, including instructions to cause the processing resource to determine to transform the touch input to the different event type in response to the touch event being received inside the particular geometric region, wherein the particular geometric region corresponds to the different event type.

3. The system of claim 1, wherein the touch sensitive mat includes
   an overlapping region defined by overlapping portions of two of the plurality of geometric regions.

4. The system of claim 3, including instructions to cause the processing resource to:
   determine whether the touch input is received within the overlapping region; and
   transform the touch input to the different event type in response to the touch event being received within the overlapping region, wherein the overlapping region corresponds to the different event type.

5. The system of claim 1, further comprising a support structure including a plurality of sensors.

6. The system of claim 5, wherein the plurality of sensors are disposed above and pointed at the touch sensitive mat.

7. The system of claim 6, including instructions to cause the processing resource to determine whether the to transform the touch input associated with the event type to the different event type based on information received from the plurality of sensors.

8. A computing device, comprising:
   a processing resource; and
   a memory resource storing non-transitory machine-readable instructions to cause the processing resource to:
   receive a touch input from a touch sensitive mat associated with an event type;
   determine whether the touch input is received within a particular region of a plurality of regions on the touch sensitive mat;
   in response to the touch event being received:
   outside the particular region, determine the touch input is invalid; and
   inside the particular region, determine whether to transform the touch input associated with the event type to a different event type based on the region of the touch sensitive mat in which the touch input was received; and
   send the touch input to an application executing on the computing device based on the determination.

9. The computing device of claim 8, including instructions to cause the processing resource to assign the plurality of regions on the touch sensitive mat, including at least:
   a first region;
   a second region; and
   an overlapping region defined by a portion of the first region that overlaps a portion of the second region.

10. The computing device of claim 9, including instructions to cause the processing resource to determine a location of the touch input on the touch sensitive mat.

11. The computing device of claim 10, including instructions to cause the processing resource to at least one of:
    determine, in response to the location of the touch event being outside the plurality of regions, the touch input is invalid;
    transform, in response to the location of the touch event being in the first region, the touch input to a first event type;
    transform, in response to the location of the touch event being in the second region, the touch input to a second event type; and
    transform, in response to the location of the touch event being in the overlapping region, the touch input to a third event type.

12. The computing device of claim 11, including instructions to cause the processing resource to prioritize the transformation of the event type based on the location of the touch event being in the first, the second, or the overlapping region according to pre-determined prioritization steps.

13. The computing device of claim 8, including instructions to cause the processing resource to:
    receive, from a plurality of sensors, disposed above and pointed at the touch sensitive mat, information regarding the touch input; and determine whether to transform the touch input associated with the event to the different event type based on the information received from the plurality of sensors.

14. A non-transitory machine-readable storage medium comprising instructions executable by a processing resource to:
receive a touch input from a touch sensitive mat, wherein the touch input is associated with an event type;
determine a particular region of the touch sensitive mat in which the touch input was received, wherein the particular region is one of a plurality of defined regions of the touch sensitive mat;
in response to the touch event being received:
outside the particular region, determine the touch input is invalid; and
inside the particular region, determine whether to transform the touch input associated with the event type to a different event type; and
send the touch input to an application executing on the computing device based on the determination.

15. The medium of claim 14, comprising instructions to:
project, via a projector assembly, images corresponding to different event types to the plurality of defined regions of the touch sensitive mat; and
transform the touch input received at the particular region to the different event type, wherein the different event type corresponds to a particular image projected to particular region.

16. The medium of claim 15, wherein the images projected via the projector assembly to the plurality of defined regions of the touch sensitive mat define virtual components having particular event types.

17. The medium of claim 14, comprising instructions to disable a different particular region of the touch sensitive mat such that a touch input received at the different particular region is not detected while receiving the touch input at the particular region.

18. The medium of claim 17, comprising instructions to enable the different particular region of the touch sensitive mat in response to the touch input at the particular region of the touch sensitive mat being completed.

* * * * *

UNITED STATES PATENT AND TRADEMARK OFFICE
CERTIFICATE OF CORRECTION

PATENT NO. : 10,481,733 B2
APPLICATION NO. : 16/364912
DATED : November 19, 2019
INVENTOR(S) : Arman Alimian et al.

Page 1 of 1

It is certified that error appears in the above-identified patent and that said Letters Patent is hereby corrected as shown below:

In the Claims

Column 14, Line 10, Claim 7, delete "the to" and insert -- to --, therefor.

Signed and Sealed this
Fifth Day of May, 2020

Andrei Iancu
*Director of the United States Patent and Trademark Office*